United States Patent [19]

Engelfried et al.

[11] Patent Number: 4,489,573
[45] Date of Patent: Dec. 25, 1984

[54] CIRCULAR KNITTING MACHINE

[75] Inventors: Werner Engelfried, Sindelfingen; Gerhard Müller, Esslingen, both of Fed. Rep. of Germany

[73] Assignee: Terrot Strickmaschinen GmbH, Fed. Rep. of Germany

[21] Appl. No.: 277,956

[22] Filed: Jun. 26, 1981

Related U.S. Application Data

[63] Continuation of Ser. No. 052,838, Jun. 28, 1979, abandoned.

[30] Foreign Application Priority Data

Jul. 6, 1978 [DE] Fed. Rep. of Germany ....... 2824678

[51] Int. Cl.³ .......................... D04B 9/00; D04B 35/00
[52] U.S. Cl. .......................................... 66/8; 384/493; 384/535
[58] Field of Search .................... 66/8; 308/26, 184 R, 308/184 A, DIG. 14

[56] References Cited

U.S. PATENT DOCUMENTS

| | | | |
|---|---|---|---|
| 2,461,851 | 2/1949 | Staples | 66/8 X |
| 3,144,278 | 8/1964 | Pöhler et al. | 308/184 R X |
| 3,351,398 | 11/1967 | Park et al. | 308/184 R X |
| 3,504,955 | 4/1970 | Bailey | 308/184 R |
| 3,549,220 | 12/1970 | Robinson et al. | 308/184 R |
| 3,640,591 | 2/1972 | Eklund | 308/184 R |
| 3,801,171 | 4/1974 | Rozentals | 308/184 R |
| 3,876,266 | 4/1975 | Rozentals | 308/184 R |
| 3,921,775 | 11/1975 | Matyschik | 308/236 X |

FOREIGN PATENT DOCUMENTS

| | | | |
|---|---|---|---|
| 356320 | 7/1922 | Fed. Rep. of Germany . | |
| 1802973 | 5/1969 | Fed. Rep. of Germany . | |
| 1919038 | 10/1970 | Fed. Rep. of Germany | 66/8 |
| 2348986 | 10/1974 | Fed. Rep. of Germany . | |
| Ad. 11708 | 4/1910 | France | 308/184 R |
| 568501 | 10/1975 | Switzerland . | |
| 803340 | 10/1958 | United Kingdom | 308/184 R |
| 1287645 | 9/1972 | United Kingdom | 66/8 |

OTHER PUBLICATIONS

Translation of German Document No. 1,919,038.

Primary Examiner—Wm. Carter Reynolds
Attorney, Agent, or Firm—Leydig, Voit, Osann, Mayer & Holt, Ltd.

[57] ABSTRACT

In a circular knitting machine problems may arise from differential thermal expansion, particularly in a radial direction, or rotatable carrier disc (22) and a coaxial bearing body (16) in which it runs by means of a bearing (36). In order to overcome this by absorption of the differential expansion, one of the running surfaces of the bearing is formed on or supported by a resiliently yieldable part (34), which preferably also preloads the bearing. As alternatives to the illustrated embodiment, in which the yielding is axial, as indicated by the arrow A, the yielding may be radial, and also the yieldable part may be on the bearing body (16) rather than the carrier disc (22).

4 Claims, 4 Drawing Figures

CIRCULAR KNITTING MACHINE

This is a continuation of application Ser. No. 52,838, filed June 28, 1979, now abandoned.

This invention relates to circular knitting machines.

In circular knitting machines having a rotating needle cylinder, the latter is usually carried by a so-called head running ring which will be referred to hereinafter as the carrier disc. This carrier disc, which is coaxial with the needle cylinder, is rotatably mounted in a stationary so-called head plate and is driven by means of teeth provided at the periphery of the carrier disc. The head plate, which will be referred to hereinafter as the bearing body, is also coaxial with the needle cylinder. It embraces the periphery of the carrier disc and engages under an edge region thereof, so that the carrier disc is supported on the lower region of the bearing body by way of an axial bearing, normally constructed in the form of a slide bearing, and is additionally mounted in the bearing body by means of a radial bearing provided at the periphery of the carrier disc. In one form of circular knitting machine marketed by the Applicants company, two wire rings are retained one above the other in a groove provided at the periphery of the carrier disc and bearing balls are provided between these rings and a circular cylindrical bearing running surface on the inside of the bearing body.

When these known circular knitting machines are brought into operation, the needle cylinder and the associated carrier disc heat up to normal operating temperature more quickly than the stationary bearing body, in particular because of the knitting tools which are guided in the needle cylinder and perform rapid upward and downward movements, that at least during a certain period of time after the circular knitting machine has been switched on, a temperature difference exists between the needle cylinder and the carrier disc supporting the same on the one hand, and the bearing body on the other hand. Because of this temperature difference the carrier disc expands to a greater extent than the bearing body; this makes itself felt above all in a radial direction, because of the dimensional proportions, so that heretofore either in the cold state radial play, large in view of the otherwise high precision of circular knitting machines, between the carrier disc and the bearing body had to be accepted, or the risk existed that the radial bearing between the carrier disc and the bearing body is damaged in the starting phase because of the occurrence of high radial pressures.

In order to avoid the sliding friction which occurs in the axial bearing of the described known circular knitting machines, between the carrier disc and the bearing body, the Applicant Company has also arranged already a so-called wire-ring ball bearing between the underside of the carrier disc and the lower part of the bearing body in the circular knitting machines marketed by them; such wire-ring ball-bearings comprise two pairs of wire rings one of which is associated with the carrier disc and the other one of which is associated with the bearing body and between which bearing balls roll. In the circular knitting machine here under discussion, the carrier disc comprises on the underside of its peripheral region a ring groove in which the two wire rings associated therewith are rigidly retained, and also the upper surface of the part of the bearing body which engages under the carrier disc is provided with a ring groove in which the two wire rings are rigidly retained.

In this known construction, too, the radial expansion of the carrier disc leads to disadvantages, because then the outer one of the two wire rings retained on the carrier disc is lifted off the bearing balls, and moreover the forces which are exerted upon the carrier disc owing to the drive of the carrier disc by means of a pinion engaging the periphery of the latter may become noticeable in a disturbing manner, namely because these forces have the tendency to tilt the carrier disc and the needle cylinder, whereby in particular in the case of circular knitting machines having a needle dial the expected uniformity of the knitted product is disadvantageously affected. It has become clear from the preceding description that in this second known circular knitting machine the wire-ring ball-bearing forms a radial bearing as well as an axial bearing.

It is an object of the invention to improve the known circular knitting machines of the type having a needle cylinder, a rotatably mounted drivable carrier disc supporting the needle cylinder and a bearing body coaxial with the needle cylinder, a peripheral region of the carrier disc being rotatably mounted on the bearing body by way of a radial bearing which comprises bearing running surfaces associated with the carrier disc and the bearing body. In particular, it is an object of the invention to provide such a bearing in which the needle cylinder is retained central in a play-free and accurate manner in every operational state and that there exists no risk of damage to the radial bearing.

According to the invention, for the purpose of compensating a radial expansion of the carrier disc, at least one of the bearing running surfaces of either the carrier disc or the bearing body is elastically supported by a means which flexes to vary the position of the bearing surface axially relative to the needle cylinder in response to pressure variations between the elastically supported bearing surface and the bearing balls. Thus the bearing running surfaces are urged elastically against each other or against roller members provided in the bearing by at least one resilient region in such a manner that always a play-free mounting of the carrier disc and thus of the needle cylinder is produced, whereby owing to the elastically yielding mounting of at least the one region supporting the bearing running surfaces a greater radial expansion of the carrier disc, in comparison with the expansion of the bearing body, can be absorbed. Constructional forms are preferred in which bearing balls are retained between corresponding bearing running surfaces so that simultaneously support in a radial and an axial direction is obtained; in order to maintain in such a case an always play-free bearing and to construct it in such a manner that it can intercept a radial expansion of the carrier disc, it is proposed to form an axial and radial bearing by means of bearing running surfaces extending in the peripheral direction on the carrier disc and the bearing body together with bearing balls disposed therebetween, wherein at least one of the component parts mounted against each other is provided with two bearing running surfaces at least one of which is retained in an elastically yielding manner. When in the region of the elastically retained bearing running surface the tangents to the bearing balls at the contact points form with the axial direction an acute angle between 0 degree and 90 degrees, the elastic mounting of the respective bearing running surface has the effect that upon a radial expansion of the carrier disc, the said surface can be displaced on the balls in a radial direction, without the accurate guidance of the carrier disc being lost. Thus the bearing running surface must merely be capable of movement in a direction which possesses a component perpendicular to the surface of the bearing ball.

From the above discussion it will be appreciated that the carrier disk and the bearing body each carry two bearing surfaces. These bearing surfaces may be integral with the carrier disk and bearing body or they may be formed on separate elements, e.g., wire rings as discussed above. It will be understood that the term "carry" as used herein in reference to the bearing surfaces and their association with the carrier disk and bearing body is intended to encompass either approach.

The simplest way is to insert commercial wire-ring ball-bearings, so that in a preferred constructional form of the invention the bearing running surfaces are formed by wire rings and at least one of the wire rings is retained by an elastically yielding region of the one of the component parts mounted against each other, i.e. the carrier disc or the bearing body; although the wire rings are then arranged in a non-displaceable manner on the parts retaining them, at least one of the wire rings may escape in an elastically yielding manner, so that the expansion of the carrier disc is absorbed in this way.

Further features, advantages and details of the invention will be clear from the accompanying claims and/or the following description and the accompanying illustrative representation of a few advantageous constructional forms of the invention; there are shown in:

Figure 1:
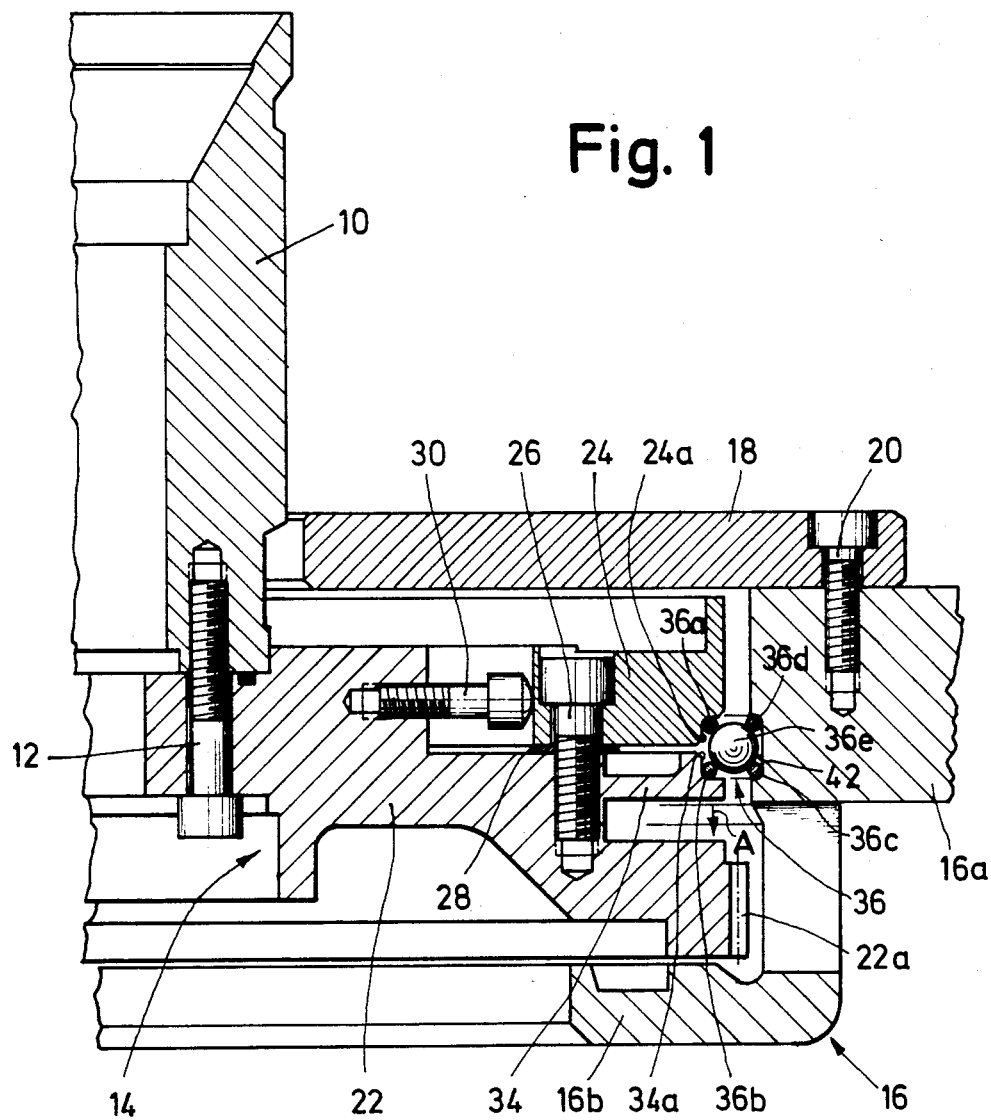
FIG. 1 is a section through a first embodiment of the bearing according to the invention.

In a section in a diametral plane, FIG. 1 illustrates a portion of a needle cylinder 10 of a circular knitting machine which is fixed by means of screws 12 onto a carrier disc 14 this carrier disc being frequently referred to as the head running ring. A ring-shaped bearing body 16, which is also referred to as the head plate, surrounds by a peripheral part 16a the periphery of the carrier disc 14 and engages below the latter by a lower portion 16b. A ring plate 18 is fixed by means of screws 20 on the bearing body 16 and supports a carrier jacket (not illustrated) surrounding the needle cylinder 10.

The carrier disc 14 consists of a disc body 22 and a clamping ring 24 which can be fixed on the disc body 22 by means of screws 26 and with the intervention of packing discs 28 and is positioned by means of centering screws 30 distributed over the periphery of the disc body 22 so that it is coaxial with the needle cylinder 10.

In applying the invention to this form of machine, the carrier disc 14 is provided with a support flange 34 which is so dimensioned than it can yield elastically in the direction of the arrow A. According to a further feature of the invention a wire-ring ball-bearing generally demoted by 36 is supported on the elastically flexible support flange 34, the clamping ring 24 and the peripheral part 16a of the bearing body 16, whereby it is attained that the carrier disc 14 is always guided in a play-free manner in the axial and radial directions. The wire-ring ball-bearing 36 consists of four closed wire-rings 36a, 36b, 36c and 36d as well as a set of bearing balls 36e which roll in the annular path defined by the annular bearing surfaces of the wire rings and are to be retained between the same always with play in every direction. For this purpose the wire-ring ball-bearing is subjected to bias tension accordance with the invention; and the wire rings 36a to 36d are non-displaceably retained on the component parts 16a, 24 and 34 (relatively to these parts). In order to bring this about, a peripheral groove 42 is provided in the inner wall of the peripheral part 16a, and the same applies correspondingly to the periphery of the carrier disc 14, but this groove is composed of small grooves 24a and 34a in the clamping ring 24 and support flange 34 respectively.

These are so dimensioned and arranged that upon tightening the screws 26 the support flange 34 is slightly deformed in the direction of the arrow A, in order to load the wire-ring ball-bearing 36 with a bias tension in this way even at stand-still of the machine.

It must also be mentioned that the carrier disc 14 and the needle cylinder 10 can be set in rotary motion by means of teeth 22a provided at the periphery of the disc body 22 cooperating with a pinion (not illustrated).

When the circular knitting machine is brought into operation, rapid sliding movement of the knitting tools (not illustrated) which are retained and guided in longitudinal grooves (not illustrated) on the periphery of the needle cylinder 10, leads to rapid heating of the needle cylinder and consequently also to heating of the carrier disc 14, so that the latter expands more, particularly in a radial direction, than the bearing body 16. Owing to the construction according to the invention the support flange 34 can then yield in the direction of the arrow A, whereby the spacing of the wire-rings 36a and 36b is increased and the latter can slide outwardly on the bearing balls 36e, whereby the radial expansion of the carrier disc 14 is compensated.

The closed wire rings 36a and 36b themselves expand along with the clamping ring 24 and the support flange 34, respectively, through a combination of thermal growth and elastic stretching as a result of their small cross sectional area. Alternatively, the rings 36a and 36b may be severed at one point around their periphery, with the butting ends free to separate slightly to compensate for unequal thermal expansion and contraction.

The travelling geometry of the wire-ring ball-bearings is not altered disadvantageously by the displacement of the wire-rings relatively to the bearing balls, however, since the angular position of the contact points between bearing balls and wire-rings is only changed by quite a small extent.

The bearing according to the invention is provided principally for high output circular knitting machines in which an above-average heat development must be expected which has as a consequence temperature differences of up to about 20° C. between carrier disc 14 and bearing body 16. At a diameter of the bearing of approximately 1,000 mm. however, such considerable dimensional difference are produced thereby that they cannot be absorbed any more by a play-free rigid bearing.

Since in the embodiments according to FIGS. 2 to 6, wire-ring ball-bearings have been used in all cases, it is sufficient to explain still merely the differences from the embodiment according to FIG. 1.

Figure 2:
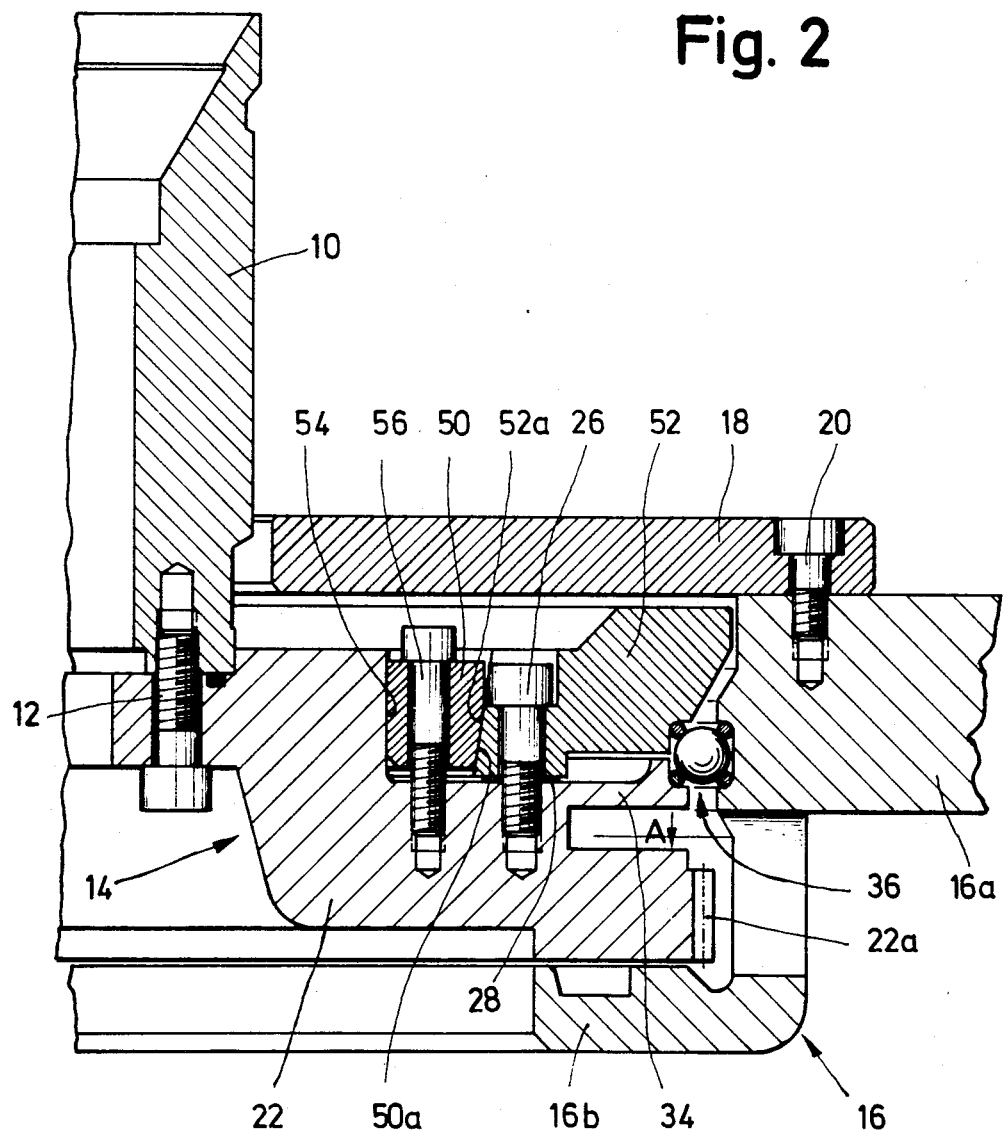
FIG. 2 is a similar sectional view of a second embodiment.

In the constructional form according to FIG. 2 a centring ring 50 takes the place of the centring screws 30 of the embodiment according to FIG. 1, the centring ring 50 having an outer cone 50a which cooperates with an inner cone 52a of a clamping ring 52 and is supported in a radial direction on a cylindrical face 54 of the disc body 22. Therefore, upon tightening the screws 56 the clamping ring 52, which is slit at one location of its periphery is urged outwards in a radial direction, whereby the bias tension is applied to the wire-ring ball-bearing 36. It must be mentioned belatedly that in this constructional example as well as also in that according to FIG. 1 the screws 26 have plat at least in a radial direction relatively to the clamping ring 52 or 24, respectively.

Figure 3:
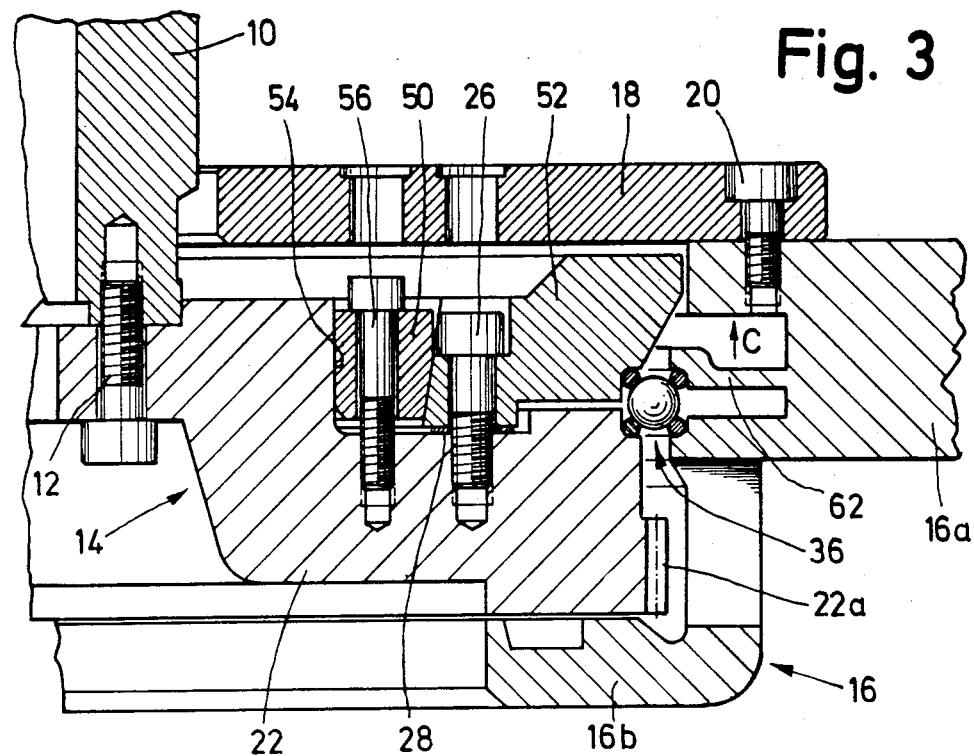
FIG. 3 is a sectional view of a third embodiment.

In the constructional form according to FIG. 3 the place of the support flange 34 of the embodiments according to FIGS. 1 and 2 is taken by an elastically flexible support flange 62 at the peripheral part 16a of the bearing body 16. In the case of a radial expansion of the carrier disc 14 the support flange 62 yields in the direction of the arrow C. Otherwise the constructional form according to FIG. 3 corresponds to the constructional form according to FIG. 2.

Figure 4:
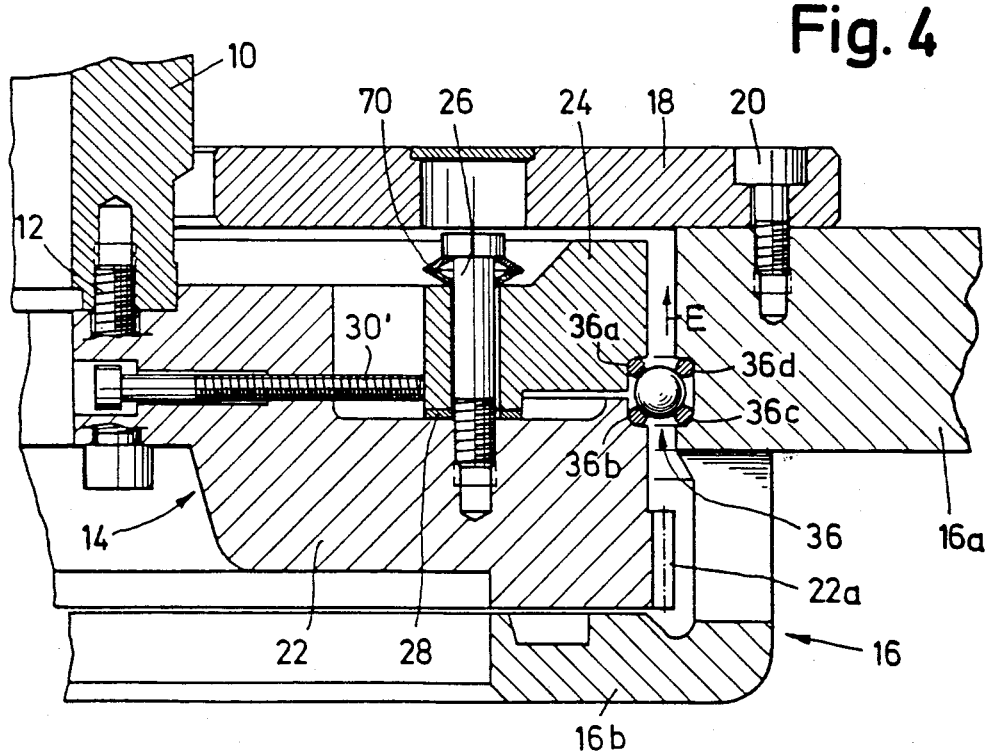
FIG. 4 is a sectional view of a fourth embodiment.

A comparison of the embodiment according to FIG. 4 and the embodiment according to FIG. 1 will show that again centring screws 30' are provided for the clamping ring 24, but that the place of a resilient support flange 34 is taken by plate springs 70 by means of which the heads of the screws 26 are supported on a clamping ring 24; therefore, the plate springs 70 are responsible for a resilient bias tension in the downward direction of the clamping ring 24 and permit the clamping ring 24 and thus the wire-ring 36a to yield resiliently in the direction of the arrow E when the carrier disc 14 expands radially.

Obviously the invention is not limited to circular knitting machines having a single needle cylinder. Thus the bearing according to the invention may be employed also e.g. in so-called purl-purl machines in which the place of the rib disc is taken by a second hanging needle cylinder which is arranged above and coaxial with the first needle cylinder.

We claim:

1. A circular knitting machine comprising a needle cylinder, a rotatable element in the form of a carrier disc supporting the needle cylinder, a stationary element in the form of a bearing body surrounding the carrier disc, the carrier disc and needle cylinder being rotatable relative to the bearing body around the needle cylinder axis, and bearing balls disposed between the carrier disc and the bearing body, the carrier disc serving as a first bearing support element and carrying bearing means comprising at least two annular bearing surfaces spaced substantially axially relative to the needle cylinder axis, the bearing body serving as a second bearing support element and similarly carrying bearing means comprising at least two annular bearing surfaces spaced substantially axially relative to the needle cylinder axis, the two annular bearing surfaces of the carrier disc bearing means and the two annular bearing surfaces of the bearing body bearing means simultaneously engaging the bearing balls and defining an annular path therefor to form a combination radial and axial bearing providing the sole bearing support for the needle cylinder, one of the annular bearing surfaces of at least one of said bearing means being elastically supported on its associated element by a means which flexes to vary thereby the position of the one said annular bearing surface substantially axially relative to the needle cylinder axis in response to pressure variations between the said one bearing surface and the bearing balls and the other annular bearing surface of the same bearing means being fixed relative to its associated element.

2. A circular knitting machine as defined in claim 1, wherein the means for elastically supporting said one annular bearing surface is a radially-extending flange.

3. A circular knitting machine as defined in claim 1 wherein the means for elastically supporting said one annular bearing surface is a spring member, said spring member being carried by the associated element of the bearing means and urging said one annular bearing surface toward the other bearing surface of the bearing means.

4. A circular knitting machine comprising a needle cylinder, a rotatable element in the form of a carrier disc supporting the needle cylinder, a stationary element in the form of a bearing body surrounding the carrier disc, the carrier disc and needle cylinder being rotatable relative to the bearing body around the needle cylinder axis, and bearing balls disposed between the carrier disc and the bearing body, the carrier disc serving as a first bearing support element and carrying bearing means comprising at least two annular bearing surfaces spaced substantially axially relative to the needle cylinder axis, the bearing body serving as a second bearing support element and similarly carrying bearing means comprising at least two annular bearing surfaces spaced substantially axially relative to the needle cylinder axis, the two annular bearing surfaces of the carrier disc bearing means and the two annular bearing surfaces of the bearing body bearing means simultaneously engaging the bearing balls and defining an annular path therefor to form a combination radial and axial bearing, one of the annular bearing surfaces of at least one of said bearing means being elastically supported on its associated element on a radially extending flange which flexes to vary thereby the position of the one said annular bearing surface substantially axially relative to the needle cylinder axis in response to pressure variations between the said one bearing surface and the bearing balls and the other annular bearing surface of the same bearing means being fixed relative to its associated element.

* * * * *

UNITED STATES PATENT AND TRADEMARK OFFICE
CERTIFICATE OF CORRECTION

PATENT NO. : 4,489,573
DATED : December 25, 1984
INVENTOR(S) : Werner Engelfried, Gerhard Muller It is certified that error appears in the above-identified patent and that said Letters Patent is hereby corrected as shown below:

Column 4, line 41, after "contraction" and before the paragraph beginning "The traveling . . ." insert this paragraph as follows:

-- From the above discussion it will be appreciated that upon expansion of both rings 36a and 36b, these rings will react against the surface of the bearing balls 36e to separate from one another substantially axially relative to the axis of the needle cylinder 10. The equilibrium position, with all wire rings 36a-36d seated on the surfaces of the bearing balls 36e, will result in a slight shifting of the needle cylinder 10 and carrier disc 22 assembly upward along the axis of the needle cylinder. --

Signed and Sealed this

Twenty-first Day of May 1985

[SEAL]

*Attest:*

DONALD J. QUIGG

*Attesting Officer*   *Acting Commissioner of Patents and Trademarks*

UNITED STATES PATENT AND TRADEMARK OFFICE
CERTIFICATE OF CORRECTION

PATENT NO. : 4,489,573
DATED : December 25, 1984
INVENTOR(S) : Engelfried et al.

It is certified that error appears in the above-identified patent and that said Letters Patent is hereby corrected as shown below:

On the title page;

Foreign Application Priority Data:

Change "2824678" to -- 2829678

Signed and Sealed this

Twenty-ninth Day of October 1985

[SEAL]

Attest:

Attesting Officer

DONALD J. QUIGG

Commissioner of Patents and Trademarks—Designate